Nov. 6, 1962  P. LEROY ETAL  3,062,524
APPARATUS FOR THE CONTINUOUS PRE-REFINING OF MOLTEN PIG IRON
Original Filed Oct. 20, 1958  3 Sheets-Sheet 1

INVENTORS
*Pierre Leroy*
*Roger Simon*

By
Kurt Kelman
AGENT

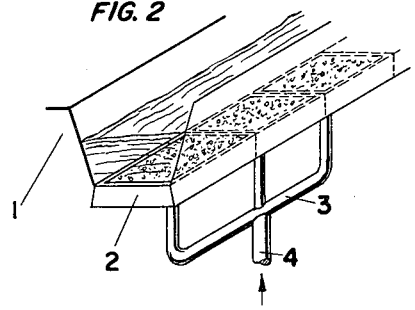
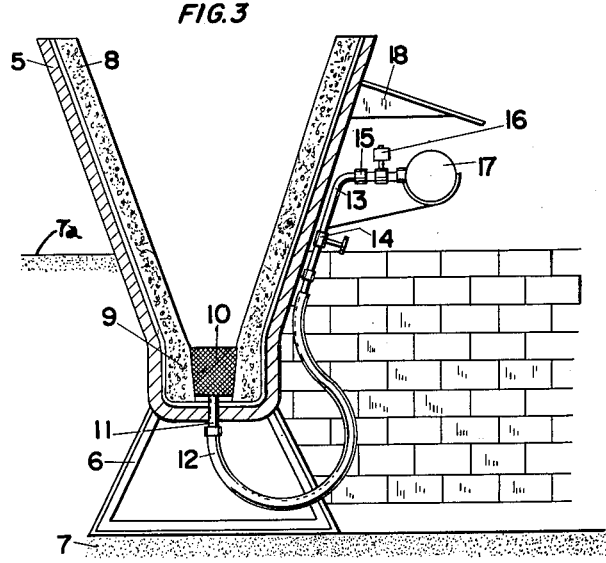
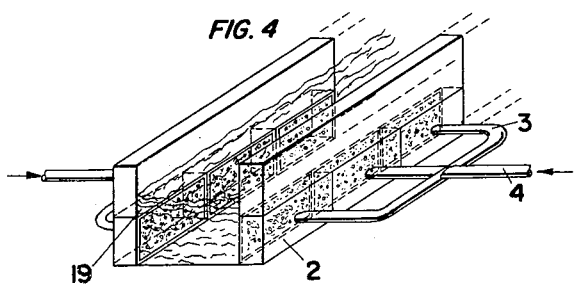

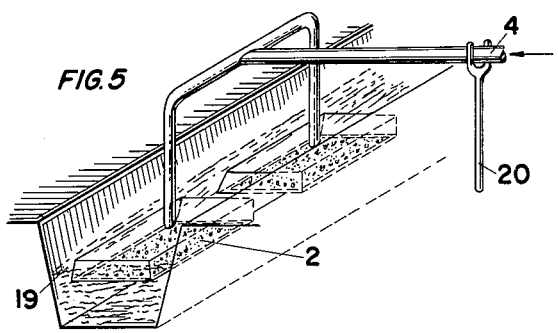
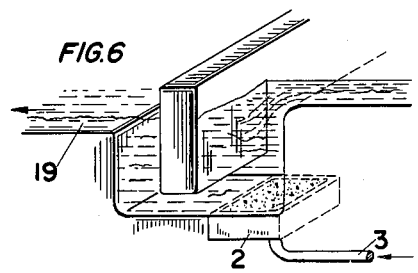
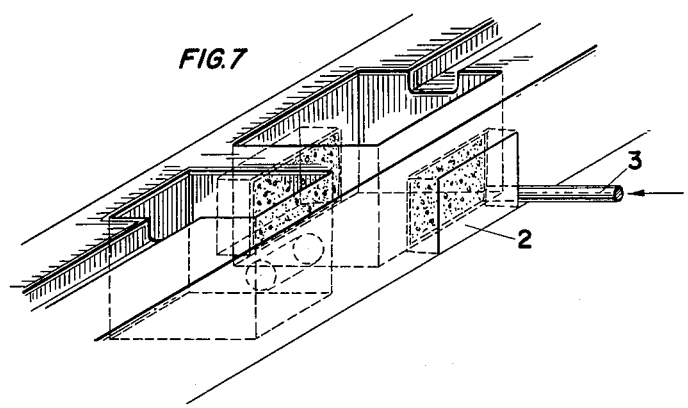
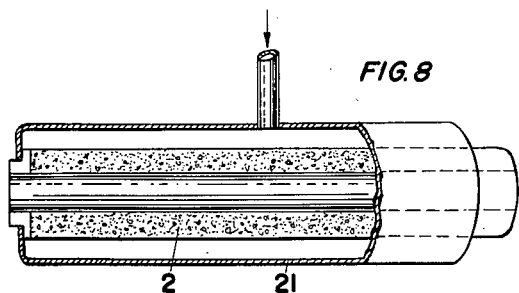

United States Patent Office 3,062,524
Patented Nov. 6, 1962

3,062,524
APPARATUS FOR THE CONTINUOUS PRE-REFIN-ING OF MOLTEN PIG IRON
Pierre Leroy, Saint Germain-en-Laye, and Roger Simon, Marly-le-Roi, France, assignors to Institut de Recherches de la Siderurgie, Saint Germain-en-Laye, France, an institution
Original application Oct. 20, 1958, Ser. No. 768,495, now Patent No. 2,975,047, dated Mar. 14, 1961. Divided and this application Nov. 28, 1960, Ser. No. 72,242
Claims priority, application France Nov. 7, 1956
3 Claims. (Cl. 266—34)

The present invention relates to steel making, and more particularly to the pre-refining treatment of molten pig iron.

The conversion of pig iron into steel involves a refining process in which the reducing elements in the iron, such as silicone and manganese, are oxidized in a pre-refining step and injurious elements, such as sulfur, are removed by desulfurizing the pig iron. The entire refining process may be carried out in one, two or even three steps, the first step being referred to herein as pre-refining.

Heretofore, only batch processes were used for refining pig iron, i.e. batches of molten pig iron were treated individually and discontinuously in a ladle, mixer, furnace, converter or crucible to refine each mass of iron separately in its vessel.

It is the primary object of the present invention to provide an apparatus for the continuous pre-refining of a flowing stream of molten pig iron, wherein a major part of the silicon in the pig iron is oxidized while the flowing stream of pig iron is insufflated with a multitude of very minute and densely moving gas bubbles and the temperature is maintained at a level at which the carbon and phosphorus content remain practically stationary so that the metal stream emerging from the apparatus contains no more than an acceptable trace of silicon.

Oxidation of the reducing elements contained in pig iron can be effected satisfactorily only if the contact of the molten metal and the oxidizing agent is of sufficient duration and intimacy. In addition, the molten pig iron must be maintained at a certain temperature to obtain the desired chemical refining reactions.

Satisfactory contact between an oxidizing agent and the molten pig iron is readily obtained in the known batch processes where a stationary mass of molten metal is subjected to oxidation. In Bessemer or Thomas converters, for instance, an oxidizing gas is bubbled upwardly through a plurality of orifices and is thus compelled to pass through the mass of molten metal in the converter. This mass is held in the converter during the oxidation and cannot escape therefrom, except in the form of ejections.

It has also been proposed to insufflate a stationary mass of molten metal in a vessel with a gaseous refining agent through a porous refractory element. Likewise, various processes of oxidizing a stationary mass of molten pig iron with a downward blast of oxidizing gas are known. In these processes, the gas jets effectively penetrate through the surface and into the interior of the iron mass which is held in position by the vessel containing it, efficient penetration and contact being assured by the high pressure of the gas jets.

The problem of assuring satisfactory contact between a refining agent and a continuously flowing stream of molten pig iron is fundamentally different. In a continuous system, there is no vessel holding a given batch of metal stationary while it is being refined. Rather, there is a flowing stream of pig iron and when such a stream is subjected to jets of a gaseous refining agent, there is always the risk that portions of the metal will escape from satisfactory contact with the gas while they flow past the gas jets or that the flow may be interrupted by the jets.

For example, when an attempt is made to insufflate a stream of molten metal in the runner of a blast furnace with a jet of gas from a vertical nozzle placed above the metal, the gas pressure is either too low to permit the gas to penetrate into the metal stream and is accordingly lost in the surrounding atmosphere or, when the pressure is increased, the strong gas jet disturbs the flow of the metal and diverts portions thereof to the edges of the runner, like a stick plunged into a rivulet of water. Practically no chemical refining action is produced in this manner.

In accordance with the present invention, these difficulties have been overcome and the problem of continuously pre-refining a flowing stream of molten pig iron has been successfully solved by effectively diffusing a refining agent in the stream without disturbing its flow and while controlling the temperature of the pig iron to produce the desired chemical refining reaction.

Since a satisfactory refining action can be achieved only when the pig iron is treated at a certain optimum temperature, we have found it to be essential to control the heating effect of the oxidizing agent used to decrease the content of reducing elements in the iron and to maintain said optimum temperature at least during the final stages of oxidation.

Accordingly, we pre-refine molten pig iron by passing a continuous stream of pig iron through a treatment zone, insufflating the stream of molten pig iron with a multitude of very minute and densely moving gas bubbles, oxidizing reducing elements in the pig iron while the gas bubbles are diffused therethrough, and controlling the temperature of the stream of molten pig iron in such manner that satisfactory oxidation of the reducing elements in the iron is effected. The insufflated gas may be an oxidizing agent, such as oxygen, at least in the final stage of the treatment zone. If an inert gas is used in the initial stage or throughout the treatment zone, a solid oxidizing agent is added to the stream of molten pig iron and the gas bubbles of the inert gas serve to assure satisfactory contact between the solid oxidizing agent and the pig iron by stirring the oxidizing agent in the pig iron, acting simultaneously as a coolant. The temperature is controlled by adding a cooling agent to the stream of molten pig iron and by correlating the amounts of oxidizing and cooling agents in the stream.

The oxidizing gas may be oxygen or any other suitable oxidizing gas. The cooling agent may be gaseous or solid. Cooling gases include inert gases, such as nitrogen, or gases dissociating endothermically at high temperatures, such as carbon dioxide or steam. Solid coolants, which may be added to the iron stream include, by way of example, lime, limestone, hammer scales, and crushed iron ore, some of which may also have some oxidizing effect.

To insure satisfactory temperature control, the temperature of the pig iron stream is measured according to the invention at several points. First, for instance the temperature is ascertained at the inlet of the treatment zone. Then, the temperature is measured at the point in the treatment zone where the cooling agent is added to the stream. Finally, the temperature is measured at the outlet of the treatment zone. The temperature at the second point may be readily regulated by the amount or the type of cooling agent added. The temperature at the third point may be equally adjusted by controlling the amount or flow of the oxidizing agent.

The above or other objects, advantages and features of the present invention will become more apparent from the following detailed description of certain preferred apparatus for carrying out the continuous pre-refining of molten pig iron, taken in conjunction with the accompanying drawing wherein FIG. 1 is a diagrammatic showing of a continuous pre-refining system according to the invention;

FIG. 2 is a perspective, diagrammatic view of a runner from a blast furnace, equipped with a porous refractory bottom portion;

FIG. 3 is a cross section showing essential elements of a runner adapted for continuous pre-refining;

FIG. 4 is a perspective, diagrammatic view of a runner equipped with porous refractory side wall portions;

FIG. 5 is a perspective, diagrammatic view of a runner with porous refractory feeder elements suspended on the surface of the iron stream;

FIG. 6 is a perspective, diagrammatic view of a syphon or rising gate having a porous refractory feeder element at its base;

FIG. 7 is a perspective, diagrammatic view of a rising gate having porous refractory feeder elements in its side walls; and FIG. 8 shows a porous tubular pipe surrounded by an impermeable sleeve.

Figure 1:
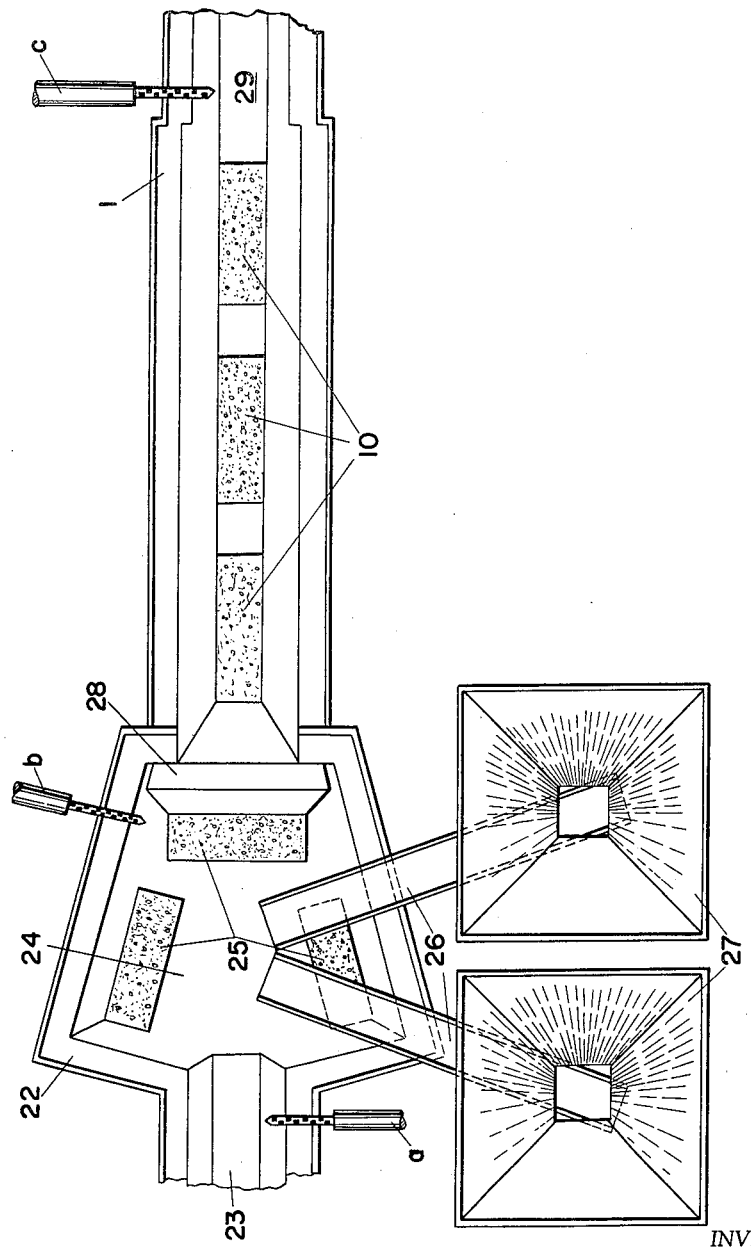

The porous portions or elements in the apparatus constitute feeder elements through which a multitude of very minute and densely moving gas bubbles are diffused in the moving metal stream.

Referring now to FIG. 1, there is shown a runner section 23 constituting the inlet means for a stream of molten pig iron to the treatment zone built according to the present invention. This treatment zone comprises a cooling and mixing basin 22 which may be made of sheet metal lined with a suitable refractory material to withstand the heat of molten pig iron. Channel means constituted by runner section 1 are arranged adjacent the cooling basin to receive a continuous flow of molten pig iron therefrom. The stream of pig iron is pre-refined in runner section 1 and the pre-refined metal leaves this section at discharge end 29.

The central area 24 of basin 22 is not insufflated while the peripheral portions of the basin bottom are provided with porous gas feeding elements 25 of suitable refractory material. The feeding elements are connected to a supply of gas (not shown). Runners 26 constitute conduit means for supplying solid additives to the molten pig iron in basin 22, the runners leading from hoppers 27 containing a supply of suitable additives to the center area 24 of the basin. An adjustable gate 28 of refractory material is arranged between the cooling and mixing basin 22 and the pre-refining runner section 1 to maintain the necessary level of pig iron in the basin for obtaining satisfactory stirring and mixing.

The solid additives, descending through runners 26 to the center of the basin into the stream of pig iron arriving from inlet 23, are stirred into the stream by the gas bubbles discharged through porous elements 25. The solid additives are prevented from sticking to the side walls of the basin by locating the gas feeding elements at the periphery of the basin. If the gas itself has a sufficient cooling effect to assure satisfactory temperature conditions for the oxidation, no solid cooling agents (which may also be oxidizing) need be added to the mass. However, an addition of a solid cooling agent, such as lime, is generally necessary to give the pre-refining slag the optimum analysis. The amount of solid additions may be readily adjusted by modifying the outlet openings of hopper 27 to obtain the optimum temperature for the oxidizing operation.

From basin 22, the pig iron stream flows over gate 28 into the pre-refining zone 1 whence it is discharged at 29 with a desirably low level of reducing elements.

Proper temperature control being critical for the satisfactory operation of the pre-refining operation, three temperature measuring devices are provided at predetermined stations of the treatment zone. Thermocouple $a$ is mounted at the inlet of the pig iron stream to measure its initial temperature. The amount of cooling agents added to the pig iron in basin 22 is adjusted according to the temperature measured at $a$ and their cooling action is determined by reading the temperature at thermocouple $b$. Then, the supply of oxidizing agent to the flowing stream of pig iron is adjusted in accordance with the temperature at $b$ to obtain the required optimum temperature for the chemical pre-refining reaction, as established by reading the temperature at thermocouple $c$, i.e. at the discharge end of the treatment zone.

The three temperatures may be continuously and simultaneously recorded on a moving tape, in a manner well known per se and forming no part of the present invention, to enable an operator to compare the temperature data instantaneously and to make any required changes in the feed rate of coolant and/or oxidizing agent to restore the desired temperatures.

Specific embodiments of apparatus suitable as pre-refining channels are shown in FIGS. 2–8, wherein like reference numerals designate similar parts. Referring to FIG. 2, the runner 1 filled with a stream of molten pig iron is shown to be provided at its bottom with a plurality of porous refractory elements 2. Each element constitutes a gas feeding element connected to gas supply pipe 3, all feeder pipes being conected to main 4 which may lead to a supply of oxygen, for instance.

FIG. 3 shows the essential parts of a preferred embodiment of a pre-refining runner used for the continuous refining operation schematically shown in FIG. 1.

The runner consists of one or more substantially V-shaped metal elements 5, the metal elements being fixedly interconnected to form a longitudinal channel for the pig iron stream. The runner rests on supports 6 on concrete floor 7 of a pit situated below the level of work floor 7a. The metal elements are lined with a suitable refractory material 8 which can withstand the heat of molten pig iron. The lower portions 9 of the refractory lining walls are preferably tapered to form a seat for porous refractory slabs 10. While the slabs 10 are wedged between the refractory lining walls, due to the tapering of wall portions 9, this may not provide a sufficiently tight fit between lining 9 and slabs 10 to prevent molten pig iron from trickling through the interstices. Therefore, before the slabs are placed in position, each of their four lateral walls are preferably coated with a thin layer of a plastic refractory material which provides the required impermeability when the slab falls into position, due to its own weight. Furthermore, these slabs are so constructed that they feed gas only through their upper face in contact with the molten metal. The structure of the gas feeding elements forms no part of the present invention and is, therefore, not further described. Suitable porous refractory elements for this purpose, and their manufacture, are described, for instance in French Patent No. 1,162,727.

Each porous slab 10 is connected to a feed pipe 13 by means of a short metal pipe 11 and a flexible tube 12. The feed pipe 13 receives gas from the distributor or main 17, the gas supply being controllable by hand valve 14, safety valve 15 and an electrically controlled valve 16.

It is preferred to make the tubes 12 of a plastic material of low melting point. In this case, the plastic tube will fuse almost instantaneously and thus interrupt the gas feed conduit when molten metal filters through the runner, due to an accident. This will prevent the passage of dangerous gases, which tend to accompany the iron, into the gas main.

The hand valve 14 regulates the gas feed rate to each slab and the valves are adjusted before the beginning of the operation so that the feed rate is uniform for all slabs, regardless of the slight variations in porosity of the various slabs.

Relief valve 15 obviates development of dangerous counterpressures while electric valve 16 provides remote control of the gas supply. Shield 18 is mounted over the gas supply conduit means to protect the pipes, valves and tubes from damage resulting from possible ejections of molten metal from the runner.

When it is desired to replace a worn slab, the flexible tube connected to its pipe 11 is disconnected and the slab is lifted from its seat by a jack or similar lifting device positioned on the floor 7 of the pit.

As will be readily apparent to the skilled in the art, the type of refractory for the gas feeding elements is so chosen that its porosity, its melting point, its resistance to mechanical wear and its chemical composition permit passage of the gas at a suitable feed rate determined by the thickness of the pig iron stream to be treated. The refractory material must, of course, also have resistance to the corrosive action of the molten metal. The pressure and gas feed rate are determined by the permeability of the refractory and by the slab surface area of the slab supplied by each gas conduit.

The embodiment of FIG. 4 is generally similar to that of FIG. 2, except that the gas feeding elements are mounted in the side walls of the runner, reaching somewhat below the average level of the pig iron stream 19 to avoid gas having been ejected above the level of the pig iron. As shown, it is preferred to make both side walls porous to keep the flow of the stream symmetrical.

In the embodiment of FIG. 5, the gas feeding elements 2 are mounted in contact with the surface of the metal stream 19, insufflation occurring herein a downward direction. The gas feeding elements are held in position by the supply pipes, pipe 4 being supported on post 20.

In the case of a rising gate (FIG. 6), the molten iron stream flows in the direction of arrow 19 and a porous gas feeding element 2 is mounted at the bottom of the gate. Alternatively, as shown in FIG. 7, the gas feeding elements may be positioned in the side walls of the rising gate.

As shown in FIG. 8, the pig iron stream may also be conducted through a tubular conduit with porous walls, which serve as gas feeding means. The porous conduit is surrounded by an impermeable sleeve or envelope 21 and gas is fed to the porous conduit walls through pipe 21a connected to sleeve 21.

The operation of the continuous pre-refining process will be illustrated by the following specific examples which, however, in no way limit the invention. Having reference to FIG. 1, the temperature of the pig iron in all examples was measured as 1350° C. at thermocouple a, as the pig iron stream entered the pre-refining zone. Pig iron of the following analysis was used:

Si=0.70%
Mn=0.50%
C=3.50%
P=1.80%

The object was to decrease the silicon content to 0.30% and the manganese content to 0.20%, which required the temperature of the pig iron to be increased by 40° C. so that the thermocouple c read 1390° C. The carbon and phosphorous content of the pig iron remained practically stationary during the treatment.

As will be self-evident, a stream of pig iron flowing from inlet 23 to outlet 29 without addition of cooling agents and/or gas cools off as it flows along so that, for instance, the temperature at b would only be 1325° C. and would sink to 1305° C. at c. The following examples show the addition of different cooling and/or heating agents maintains the temperature at c at the desired level of 1390° C.:

*Example I*

The temperature of the pig iron was lowered in the basin 22 by natural cooling by 25° C. An additional lowering of the temperature by 15° C. was obtained by adding 10 kg. of lime per ton of pig iron. The temperature was lowered an additional 65° by diffusing 4.7 m.$^3$ of steam per ton of pig iron through porous elements 25, causing a total reduction of 105° C. so that the temperature at thermocouple b read 1245° C.

7 m.$^3$ of oxygen per ton of pig iron was supplied in the pre-refining runner through gas feeding elements 10 to raise the temperature by 165° C., the natural cooling of the flowing stream in the runner reducing this by 20° C., accounting for a net temperature gain of 145° C. in the pre-refining or oxidizing zone. This brought the temperature at thermocouple c to the desired level of 1390° C.

*Example II*

The natural 25° C. reduction of temperature in basin 22 was increased to a total reduction of 65° C. by the addition of the following coolants to the pig iron stream:

5 kg. of lime per ton of pig iron caused an additional temperature reduction of 10° C.

Blowing 1 m.$^3$ of nitrogen per ton of pig iron through elements 25 produced a 5° C. lowering of the temperature and a further cooling by 25° C. was obtained by adding 10 kg. of limestone (which also has a slight oxidizing action) per ton of pig iron. The nitrogen caused the solid coolants to be well mixed in the pig iron mass whose temperature at b was ascertained to be 1285° C.

While natural cooling in the pre-refining zone would have reduced the temperature by another 20° C. and another 20° C. reduction would have been caused by the residual cooling effect of the limestone in the pig iron mass, blowing of 6 m.$^3$ of $O_2$ per ton of pig iron caused the temperature to be raised by 145° C., producing a net gain of 105° C. in the oxidizing zone. Thus, the temperature at c again read 1390° C.

*Example III*

The natural 25° C. temperature reduction in basin 22 was maintained unchanged by the following additions cancelling each other's thermal effects:

Addition of 10 kg. of lime per ton of pig iron cooled the mass by 15° C. and an additional 5° C. temperature reduction was obtained by diffusing 1 m.$^3$ of nitrogen per ton of pig iron through elements 25. However, the addition of 40 kg. of hammer scales (71% Fe) per ton of pig iron balanced the combined cooling effect of the lime and nitrogen because the oxygen contained in the hammer scales reacts chemically and evolves heat although the addition itself is cooling. Accordingly, the temperature at b was 1325° C.

The identical effect was obtained when crushed iron ore (57% Fe) was used as an addition instead of hammer scales.

The temperature was raised by 65° C. in the oxidizing zone by diffusing 2.5 m.$^3$ of oxygen per ton of pig iron through elements 10. The residual thermal effect of the addition of hammer scales or crushed iron ore in runner 1, amounting to +20° C., was balanced by the natural temperature loss in this zone so that the temperature at c temperature at b was 1325° C.

It will be obvious to the skilled in the art that the above operating conditions and additions may be varied infinitely to obtain the desired temperature control, the purpose always being to prevent the oxidation during the pre-refining process to raise the temperature at c above 1390° C., which gives an excellent efficiency for decreasing the silicon content of the pig iron as well as its content of manganese, if present in sufficient quantity, while keeping its carbon and phosphorous content substantially unchanged.

Many modifications and changes of the process and apparatus may occur to the skilled in the art, particularly after they have benfited from the present teaching, without departing from the spirit and scope of this invention which is not limited to the embodiments hereinabove described and illustrated by way of example and which is defined by the appended claims.

This is a continuation-in-part of our application Serial No. 694,559, filed November 5, 1957, now abandoned, and a division of our application Serial No. 768,495, filed October 20, 1958, now Patent No. 2,975,047, dated March 14, 1961.

What we claim is:

1. An apparatus for the continuous pre-refining of a stream of molten pig iron, comprising channel means having an inlet and an outlet whereby the stream of pig iron passes through the channel means from the inlet to the outlet, means for continuously measuring the temperature of the pig iron stream at the inlet, porous gas feeding means of refractory material mounted in said channel means, conduit means for supplying gas to the porous gas feeding means whereby the stream of pig iron may be insufflated with a multitude of very minute and densely moving gas bubbles, a supply of at least one solid, particulate temperature modifying agent, means for feeding said supply to said channel means, means for adjusting the feed rate of the temperature modifying agent, means for continuously measuring the temperature of the pig iron where the temperature modifying agent is fed thereinto, and means for continuously measuring the temperature of the pig iron at the outlet.

2. The apparatus of claim 1, wherein the channel means comprises a porous conduit of refractory material, which constitutes the gas feeding means, an impermeable envelope encloses the porous conduit and said gas supply conduit means is connected through said envelope.

3. The apparatus of claim 1, wherein said channel means comprises a metal runner having two lateral walls and a bottom wall, a refractory lining on each lateral wall, at least one porous slab of refractory material mounted on said bottom wall between the lateral wall and constituting said gas feeding means, a plastic refractory material sealing the joint between the lateral walls and the slab, a short metal gas pipe extending from the slab outwardly through an opening in the bottom wall, and a flexible tube of plastic connected to said gas pipe, said gas pipe and flexible tube constituting part of the gas supply conduit means.

References Cited in the file of this patent

UNITED STATES PATENTS

| 16,690 | Martien | Feb. 24, 1857 |
| 714,449 | Carson | Nov. 25, 1902 |
| 714,450 | Carson | Nov. 25, 1902 |
| 2,741,556 | Schwartz | Apr. 10, 1956 |
| 2,947,527 | Spire | Aug. 2, 1960 |

FOREIGN PATENTS

| 12,363 | Great Britain | Sept. 29, 1886 |

OTHER REFERENCES

Clements: Blast Furnace Practice, vol. II, pp. 453–455, 466, 474–478, 1929.